US008094685B2

(12) United States Patent
Potenzone

(10) Patent No.: US 8,094,685 B2
(45) Date of Patent: Jan. 10, 2012

(54) SYSTEMS AND METHODS FOR SYNCHRONIZING MULTIPLE VIDEO STREAMS

(75) Inventor: Vincent Potenzone, Barrington, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1024 days.

(21) Appl. No.: 11/623,355

(22) Filed: Jan. 16, 2007

(65) Prior Publication Data

US 2008/0084899 A1 Apr. 10, 2008

Related U.S. Application Data

(60) Provisional application No. 60/849,283, filed on Oct. 4, 2006.

(51) Int. Cl.
*H04J 3/06* (2006.01)
(52) U.S. Cl. ....................................................... 370/503
(58) Field of Classification Search .................. 370/503, 370/507–510, 512–514, 516–519; 375/359, 375/362
See application file for complete search history.

(56) References Cited

U.S. PATENT DOCUMENTS

| 5,062,107 | A  | * | 10/1991 | Heiss et al. ................... 370/514 |
| 7,096,137 | B2 |   | 8/2006  | Shipton et al. |
| 7,110,006 | B2 |   | 9/2006  | MacInnis et al. |
| 7,126,126 | B2 |   | 10/2006 | Schyler et al. |
| 7,148,929 | B1 |   | 12/2006 | Mori et al. |
| 7,149,811 | B2 |   | 12/2006 | Wise et al. |
| 7,447,237 | B2 | * | 11/2008 | Koshino et al. ................ 370/503 |
| 2004/0174370 | A1 | * | 9/2004  | Stoll et al. ..................... 345/502 |
| 2005/0138459 | A1 | * | 6/2005  | Yoon et al. ..................... 713/600 |
| 2006/0017847 | A1 | * | 1/2006  | Tardif ........................... 348/536 |

* cited by examiner

*Primary Examiner* — Derrick Ferris
*Assistant Examiner* — Peter Cheng
(74) *Attorney, Agent, or Firm* — Alexander J Burke

(57) ABSTRACT

A system and method to produce video data by transmitting time information with the video data. The equivalent horizontal and vertical timing at the reception device are reconstructed. The method includes receiving one or more control packets specifying a quantity of pixels in an associated data packet. Data packets are received that contain the quantity of pixels specified in the associated control packet. A time interval between received control packets is determined. A running average of the time intervals is calculated and a time interval of a current control packet is determined. The running average is compared with the time interval of the current control packet. A clock frequency is adjusted as a function of the comparing step.

29 Claims, 4 Drawing Sheets

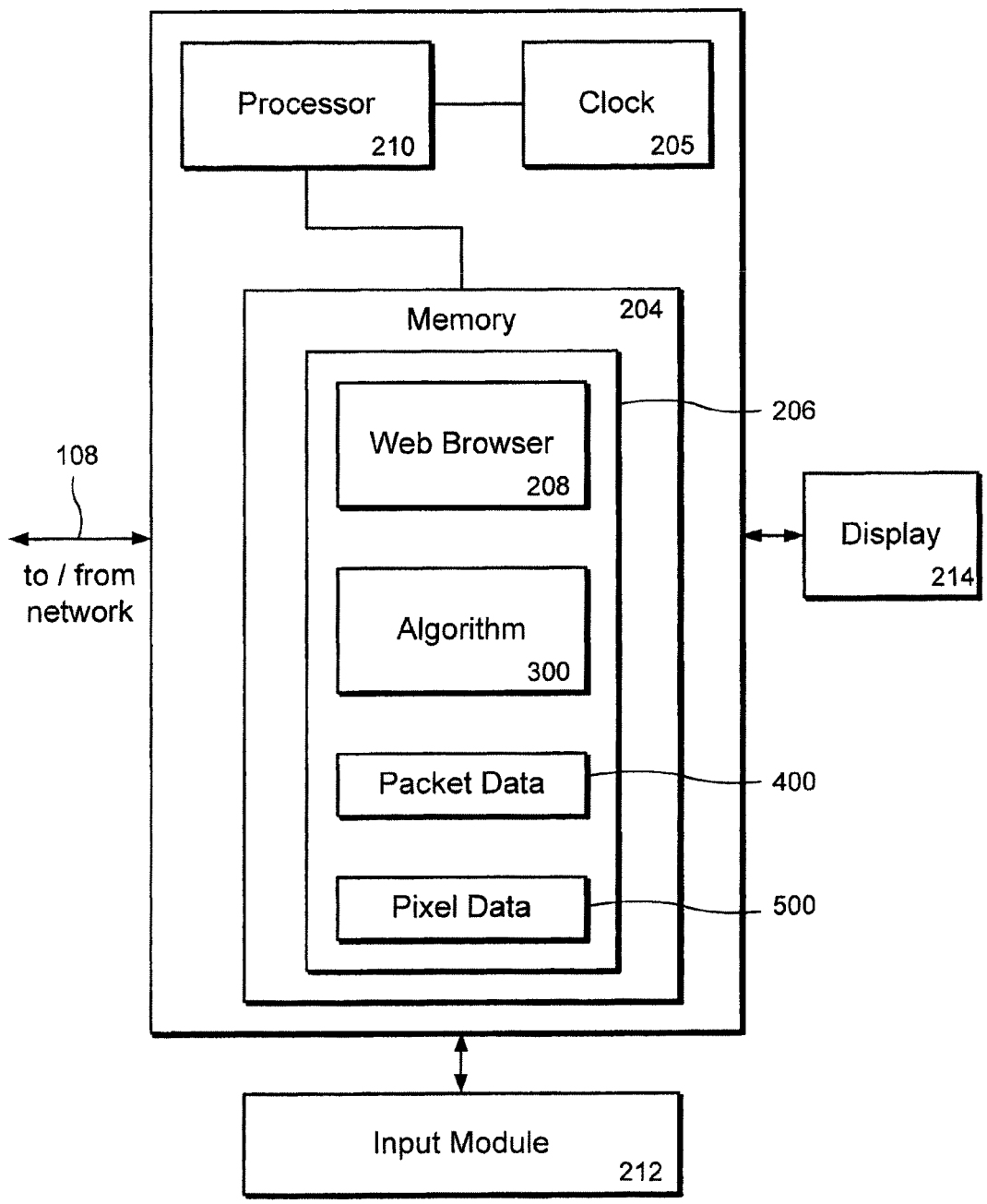
F I G. 2

400

| Packet 404 | Channel 408 | Line 412 | Pixels 416 |
|---|---|---|---|
| 1 _424_ | 1 _428_ | 27 _422_ | 800 _426_ |
| 2 _434_ | 2 _438_ | 712 _432_ | 1280 _436_ |
| 3 _444_ | 1 _448_ | 26 _442_ | 800 _446_ |
| 4 _454_ | 2 _458_ | 711 _452_ | 1280 _456_ |
| ⋮ | ⋮ | ⋮ | ⋮ |
| n _464_ | 1 _468_ | m _462_ | xxx _466_ |

F I G. 4

500

| Line | Pixel data |
|---|---|
| 27 | |

502  504

F I G. 5

SYSTEMS AND METHODS FOR SYNCHRONIZING MULTIPLE VIDEO STREAMS

CROSS-REFERENCE TO RELATED APPLICATIONS

This application claims a priority benefit to provisional application Ser. No. 60/849,283, filed on Oct. 4, 2006 and entitled "Method For Synchronizing Multiple Video Streams Over A Network Of Indeterminate Latency" which is hereby incorporated by reference in its entirety herein.

BACKGROUND

1. Field of the Invention

This invention relates generally to transmitting video data. More particularly, the present invention is directed to transmitting packet information and adjusting a clock frequency.

2. Background Discussion

In order to transmit synchronous data, both frequency and phase must remain constant. For example, two identical crystal oscillators will never have the exact same frequency. Indeed, their relationship may never be constant or determinate. Similarly, the same principle applies to video generated from the oscillators. Typical synchronization techniques require that the clock frequency of the destination match exactly the clock frequency of the source. A standard triple buffering technique uses three frames of video: input frame, idle frame, output frame; and thereby reduces the effect of wandering phase. Unfortunately, this technique has the disadvantage of increased latency. There is typically a 1 to 3 frame delay between the input stream and the output stream if the clocks match very closely. If there is a large difference in the clock frequencies, then some frames of data may be dropped and some frames of data may be displayed multiple times. If a high latency network is used, additional frames of data may need to be buffered to overcome the network pauses. This is a less than desirable approach for an interventional or real-time system where the user is using the video as feedback for real-time actions, such as computer aided diagnosis (CAD) procedure e.g., the positioning of a catheter in a beating heart.

Therefore, it would be an advancement in the state of the art to provide a system and method that adjust a clock frequency as a function of control data and associated packet data.

SUMMARY

Thus, the present invention is directed to systems and methods for synchronizing multiple video streams over a network of indeterminate latency. This synchronization may be used in medical imaging systems to improve real-time imaging.

Accordingly, one embodiment of the present invention is directed to a method for synchronizing multiple video streams (hereinafter, merely "the method"). This method includes accessing one or more control packets specifying a quantity of pixels in an associated data packet. Data packets are accessed that contain the quantity of pixels specified in the associated control packet. A time interval between received control packets is determined. A running average of the time intervals is calculated and a time interval of a current control packet is determined. The running average is compared with the time interval of the current control packet. A clock frequency is adjusted as a function of the comparing step.

Another embodiment of the present invention is directed to the method described above and also includes determining the difference between the running average and the time interval of the current control packet.

Yet another embodiment of the present invention is directed to the method described above wherein when the comparing step indicates that the running average exceeds the time interval of the current control packet, the clock frequency is decreased.

Yet another embodiment of the present invention is directed to the method described above wherein when the comparing step indicates that the running average is lower than the time interval of the current control packet, the clock frequency is increased.

Yet another embodiment of the present invention is directed to the method described above wherein when the comparing step determines that the running average exceeds the time interval of the current control packet, the adjusting step decreases a size of an incoming buffer.

Yet another embodiment of the present invention is directed to the method described above wherein when the comparing step determines that the running average is lower than the time interval of the current control packet, the adjusting step increases a size of an incoming buffer.

Yet another embodiment of the present invention is directed to the method described above wherein the control packet specifies the quantity of pixels in a horizontal line and includes a decrementing line count and a channel address.

Yet another embodiment of the present invention is directed to the method described above and the adjusting step adjusts a size of an incoming buffer as a function of the comparing step.

Yet another embodiment of the present invention is directed to the method described above wherein the adjusting step adjusts a horizontal line time as a function of the comparing step.

Yet another embodiment of the present invention is directed to the method described above wherein the adjusting step adjusts a vertical line time as a function of the comparing step.

Yet another embodiment of the present invention is directed to the method described above wherein the determining step utilizes a local clock to determine the time intervals.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIG. 2 illustrates a block diagram of a processing device shown in FIG. 1;

FIG. 4 illustrates a data structure of a control packet in accordance with an embodiment of the present invention; and FIG. 5 illustrates a data structure of a data packet in accordance with an embodiment of the present invention.

DETAILED DESCRIPTION

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As stated previously, the present invention is directed to a system and method for synchronizing multiple video streams in a network of indeterminate latency.

Figure 1:
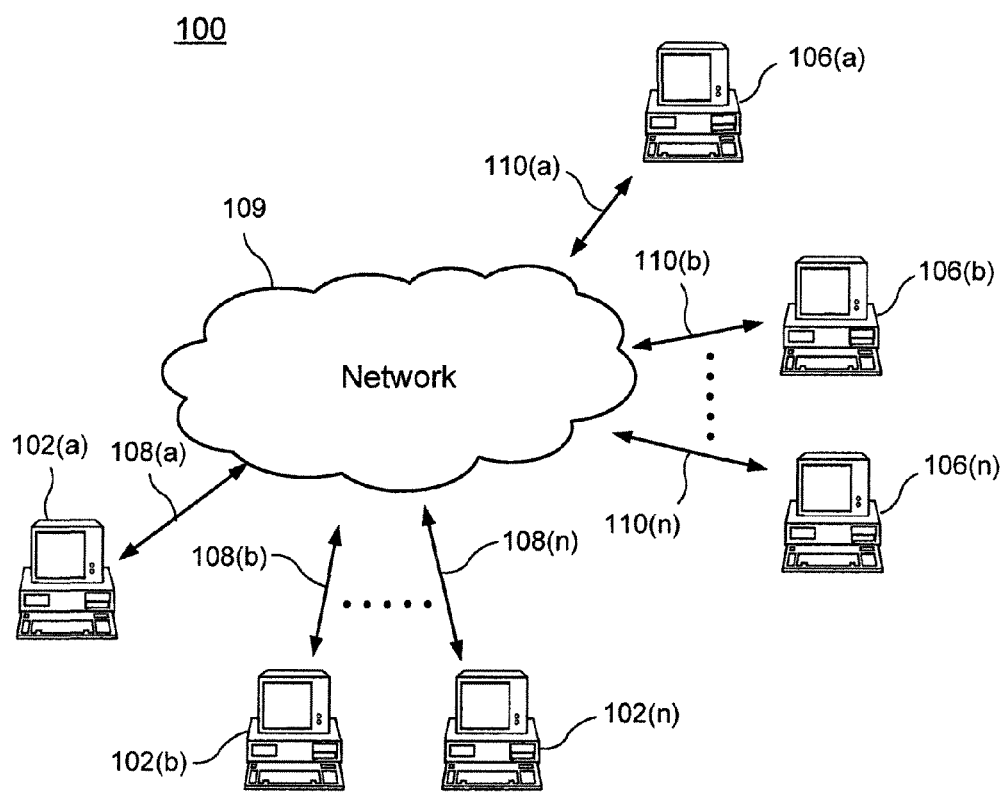
FIG. 1 illustrates a network environment adapted to support embodiments of the present invention.

An example of the invention is described in a network environment. Specifically, FIG. 1 shows a network environment 100 adapted to support the present invention. The exemplary environment 100 includes a network 109, a plurality of processing devices, 102(a) . . . (n) (where "n" is any suitable number) (collectively referred to herein as processing devices 102) and a plurality of processing devices 106(a) . . . (n) (where "n" is any suitable number) (collectively referred to herein as processing devices 106). These processing devices (102, 106) may be integral to a display device, in which case they may be deemed display processing modules that control a graphical user interface (GUI) of the display device. Alternatively, the processing devices (102, 106) may be disposed in a separate housing and be operatively coupled to a display device.

The network 109 is, for example, any combination of linked computers, or processing devices, adapted to transfer (transmit and/or receive) and process data. The network 109 may include wireless and wired transmission capabilities. The network 109 may be a private Internet Protocol (IP) network, as well as a public IP network, such as the Internet that can utilize World Wide Web (www) browsing functionality. Alternatively the network 109 may be an Ethernet network, or any two or more operatively coupled processing devices that can share information. An example of a wired network is a network that uses communication busses and MODEMS, or DSL lines, or a local area network (LAN) or a wide area network (WAN) to transmit and receive data between terminals 102 and 106. An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems which enables connection to the Internet or other machines that have Wi-Fi functionality. Wi-Fi networks broadcast radio waves that can be picked up by Wi-Fi receivers that are attached to different computers.

Processing devices, or terminals, 102 and 106 are typically computers, or other processing devices such as a personal digital assistant (PDA), wireless handheld device, mobile telephone, personal computer (PC), desktop, notebook and the like. The processing devices typically include processing and storage modules. They may be capable of processing and storing data themselves or merely capable of accessing processed and stored data from another location (i.e., both thin and fat terminals). Processing devices 102 are operatively connected to network 109, via a bi-directional wired or wireless communication link 108(a) . . . (n), respectively (where "n" is any suitable number) (collectively referred to herein as link 108). Processing devices 102 may also include input devices such as a keyboard, mouse, track ball and/or touch pad.

Processing devices 106 are operatively connected to network 109, via a bi-directional wired or wireless communication link 110(a) . . . (n) (where "n" is any suitable number) (collectively referred to herein as link 110). Processing devices 102 are operable to transmit one or more video streams to processing devices 106 via the network 109. Processing devices 102 and 106 are described in more detail in relation to FIG. 2.

The processing device transmitting the video data (e.g., module 102) assembles the video data into packets containing one horizontal line. Horizontal synchronization is used to transmit a control packet containing the number of pixels in the following horizontal line and a decrementing horizontal line count. With multiple streams the control packets also have a channel address and the horizontal lines are transmitted sequentially up to the bandwidth of the network. When the horizontal line count reaches zero a vertical sync interval has started. The source will continue to send control packets with a zero line count until the start of the next frame. A local clock is selected so that the number of pixels being sent can be clocked between the arrivals of the control packets. The relationship between the control packets and their associated data packets is one to one.

FIG. 2 illustrates an example of a processing device, or module 102 (or 106) that is adapted to receive, store, manipulate and process data related to the present invention. The processing device, or module 102 (or 106) may be integral to a display unit that includes the processing module and a display module in a single housing. In such an embodiment the modules 102 and 106 may be deemed display processing modules and the clock 205 may be deemed a display clock. The processing device 102 includes a memory module 204, clock module 205, processor module 210, input module 212 and display module 214. Processing device, or module, 106, may be similarly constructed.

Memory module 204 is typically an electronic storage medium such as RAM, ROM, EEPROM or other memory device, such as an optical disk, optical tape, CD, or a floppy disk, a hard disk, a portable memory stick that can be inserted into a port (such as a USB port) or other communication connector, or a removable cartridge, on which digital information is stored in the form of bits. The memory module 204 may also store program storage module 206, which include, for example, a web browser module 208, algorithm storage module 300, packet data storage module 400 and pixel data storage module 500, as well as typical operating system programs (not shown), input/output programs (not shown), and other programs that facilitate operation of processing device 102. The storage modules identified above (300, 400, 500), when used in conjunction with the CPU (the CPU fetches, or accesses the contents of the storage module) provide an associated composite structural module that performs the functionality recited in the corresponding storage module. Thus, when the processing is executed utilizing the contents of a storage module, the composite module provides a means for performing the associated functionality.

Web browser module 208 stores a web browser program that is for example an Internet browser program such as Internet Explorer™. Algorithm storage module 300 stores an algorithm, which is a series of steps for accessing, manipulating and/or processing selected data, which is typically stored on a computer-readable memory and executed by a processor. The algorithm 300 is discussed in more detail in relation to FIG. 3.

Packet data storage module 400 is electronic storage adapted to store packet data including a packet number, channel, line number and pixel data. While this storage module 400 may be disposed in the processing module, the contents may also be stored at a remote location and retrieved, or accessed by the processing module 102 or 106.

Pixel data storage module 500 is electronic storage adapted to store line number data and pixel data. While this storage module 400 may be disposed in the processing module, the contents may also be stored at a remote location and retrieved, or accessed by the processing module 102 or 106.

Processor 210, which is operatively connected to memory module 204 and to clock module 205, is used to process and manipulate the data retrieved and stored by processing device 102 or from another device coupled to the network (shown as element 104 in FIG. 1). The processor 210 may be a dedicated processor for the display unit 214, or may perform other processing for other components as well. The processor 210 is typically a microprocessor with sufficient speed and processing capacity to adequately perform the desired data manipulations of processing device 102. Clock module 205 may be a display clock module that is dedicated to the display module, or may be adapted to perform clock functionality for other components in the system. The clock module 205 is adapted to adjust a frequency of incoming image data based on the control (packet) data received.

Input module 212 is, for example, a keyboard, mouse, trackball, touch pad, menu having soft-keys, or any combination of such elements, or other input facility adapted to provide input to processing device 102.

Display module 214 is, for example, a monitor, LCD (liquid crystal display) display, plasma, GUI (graphical user interface) or other interface facility that is adapted to provide or display information to a user. Other display modules could include a printer or other output module. The display module 214 and processor 210 may be a single integrated unit such that the processor is a display processor, the memory is a display memory and the clock is a display clock.

Figure 3:
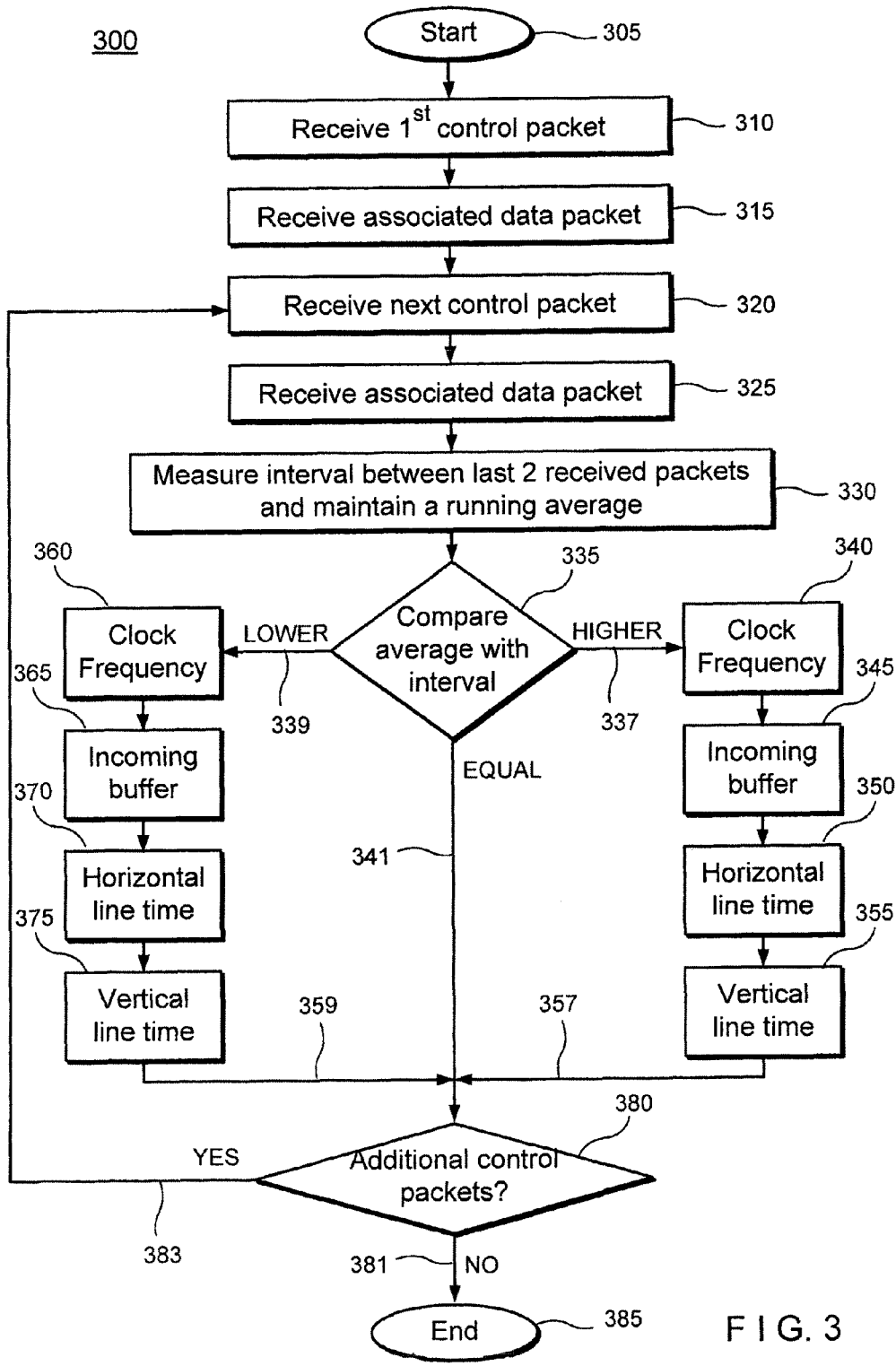
FIG. 3 illustrates a flow chart of one embodiment of the present invention.

As shown in FIG. 3, algorithm 300 is a series of steps, typically stored on a computer-readable medium, that may be executed by a processing device to implement the present invention. The algorithm 300 may be stored on any suitable electronic medium, such as the memory units, or modules, shown in FIG. 2. The algorithm may be stored on an electronic medium and the CPU, when executing the program code of the algorithm is a processing module adapted to perform the recited functionality. Step 305 begins execution of the algorithm. A first control packet is received, or accessed, for example at a processing module or a memory module, as described herein, shown in step 310. The data associated with the first control packet is received, or accessed, for example at a processing module or a storage module, as described herein, as shown in step 315.

Step 320 shows that the subsequent control packet is received, or accessed, and the associated data packet is received, or accessed, in step 325. The data may be received or accessed from a processing device, network device or other source of data, and is typically transmitted over a network or other transmission medium.

Step 330 shows that the time interval between the first received control packet and the subsequently received control packet is measured using the local clock (such as the clock shown as element 205 in FIG. 2, which may be a dedicated display unit clock). A running average of this time interval is maintained.

Step 335 compares the running average with the measured time interval between the last two received control packets. As the time is measured (using the clock described herein) between control packets, the time is compared to the running average. Based on the sign and the magnitude of the difference between the running average and the measured time interval, corrections are made to the local clock frequency, the size of the incoming buffer, the horizontal line time and the vertical line time. A running average of the difference provides a measure of network latency. If a control packet is not received when it is expected a flag is set and the size of the input buffer is increased. The transmission of the horizontal line count makes it easier to maintain vertical alignment. For example, the clock frequency could be adjusted line-by-line (either vertical line and/or horizontal line) by one or two pixel times, which may be between approximately 0.25 and 0.75 nanoseconds, and more specifically typically 0.5 nanoseconds.

If the running average exceeds the measured time interval, line 337 leads to step 340 in which the clock frequency is adjusted. This adjustment is typically an increase in the frequency. Step 345 shows that the incoming buffer is adjusted based on the clock frequency. The incoming buffer may be increased, based on the clock frequency. Step 350 shows that the horizontal line time is adjusted (increased) based on the clock frequency. Step 355 shows that the vertical line time is adjusted (increased) based on the clock frequency. Line 357 leads to step 380.

If the running average does not exceed the measured time interval, line 339 leads to step 360 in which the clock frequency is adjusted. The clock frequency is decreased. Step 365 shows that the incoming buffer is adjusted based on the clock frequency. The buffer may be decreased, or remain constant since it has adequate capacity. Step 370 shows that the horizontal line time may be adjusted, the adjustment may be to decrease the line time, based on the clock frequency. Step 375 shows that the vertical line time is adjusted, the adjustment may be to decrease the line time, based on the clock frequency. Line 359 leads to step 380.

If the answer to step 335 is that the running average is equal to the measured time interval, line 341 leads to step 380.

Step 380 shows that a determination is made whether additional control packets are incoming. If the answer to step 380 is "yes", line 383 leads back to step 320, described previously, and the control packet is received. If the answer to step 380 is "no", line 381 leads to the end of the algorithm, as shown in step 385.

The present invention can also be applied to sending synchronous data over networks where the time of flight for the control packets exceeds the time between data packets and synchronization is maintained by the relative arrival time between the control packets. This synchronization is achieved by a clock, such as the clock 205 described herein.

FIG. 4 illustrates an example of the structure of a control packet 400 according to one embodiment of the present invention. This data may be stored in electronic storage medium 400.

The control packet 400 includes packet section 404, which stores the packet number. Section 408 stores the channel number. Section 412 stores the line number for which pixel data will be sent in the associated data packet. Section 416 stores the number of pixels which will be sent in the associated data packet.

An example showing multiple streams of data is shown in FIG. 4. Specifically, FIG. 4 shows a control packet storage area (element 404) storing a packet number quantity 1 . . . . n, where "n" is any suitable number. Control packet number 1 is shown as element 424, control packet number 2 is shown as element number 434, control packet number 3 is shown as element 444, control packet number 4 is shown as element 454 and control packet number n is shown as element 464.

Channel storage area (element 408) stores a channel number. The channel for control packet 1 is one, as shown by element 428, the channel for control packet 2 is two, as shown by element 438, the channel for control packet 3 is one, as shown by element 448, the channel for control packet 4 is 2, as shown by element 458, the channel for control packet n is one, as shown by element 468.

Line storage area 412 stores line data information corresponding to an associated data packet. For example, packet 1 has a line data quantity of 27, as shown by element 422, packet 2 has a line data quantity of 712, as shown by element 432, packet 3 has a line data quantity of 26, as shown by element 442, packet 4 has a line data quantity of 711, as shown by element 452, and packet n has a line data quantity of "m", as shown by element 462.

Pixel storage area 416 stores pixel data associated with a corresponding data packet. For example, packet 1 (element 424) has associated pixel quantity 800, shown as element 426. Packet 2 (element 434) has associated pixel quantity 1280, shown as element 436. Packet 3 (element 444) has associated pixel quantity 800, shown as element 446. Packet 4 (element 454) has associated pixel quantity 1280, shown as element 456. Packet n (element 464) has associated pixel quantity xxx, shown as element 466.

The pixels may not use all of the network capacity (time or storage) available. As shown in the example of FIG. 4, packet 1, line 27 pixel data quantity 800 (element 426) uses only 20% of the network time. Packet 2, line 712 pixel data 1280 (element 436) uses 35% of the network time. Packet 3, channel 1 line number 26 has 800 pixels (element 446), which uses only 20% of the network time. Control packet 4, channel 2 line 711 has 1280 pixels (element 456), which uses 35% of the network time. Thus, by utilizing a clock frequency, the data may be efficiently received. This clock adjustment is enabled because of the control packet data indicating the quantity, or amount of image data.

In this example it is important to note that the control packets travel asynchronously and independently over the network. The relationship between the control packets and their data packets is one to one. With multiple channels, the data for each line is sent sequentially.

Because the data travels at the speed of the network several lines of data can be buffered to account for network latency. The buffers are emptied at the local video rate.

FIG. 5 illustrates the data structure of a data packet 500 according to one embodiment of the present invention.

Section 502 of the data packet 500 stores the line number, (shown as "27"), whose pixel data is included in section 504. Section 504 stores the pixel data for the line number specified in section 502.

It will be appreciated from the above that the invention may be implemented as computer software, which may be supplied on a storage medium or via a transmission medium such as a local-area network or a wide-area network, such as the Internet.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method for synchronizing video data streams, comprising the activities of:
    accessing a plurality of sequential control packets specifying a quantity of pixels conveyed in an associated plurality of sequential data packets, an individual control packet being associated with a corresponding sequential single data packet and individual control packets having intervening data packets, said control packets and data packets comprising a received video data stream;
    accessing a data packet containing a quantity of pixels specified in an associated control packet of the received video data stream;
    determining for a plurality of sequential control packets, a reception time interval between an accessed control packet and a subsequent control packet following a data packet associated with the accessed control packet of the received video data stream;
    calculating a running average of the determined reception time intervals, of the received video data stream;
    determining a current reception time interval between a current control packet and a previous sequential control packet, of the received video data stream;
    comparing the running average with the current reception time interval of the current control packet; and
    adjusting a clock frequency of the received video data stream exclusively as a function of the reception interval comparing step.

2. The method according to claim 1, wherein the comparing step determines a difference between the running average and the time interval of the current control packet and including the activity of,
    adjusting a horizontal line time of the received video data stream in response to the comparison.

3. The method according to claim 2, wherein when the comparing step determines that the running average exceeds the time interval of the current control packet, the adjusting step increases the clock frequency.

4. The method according to claim 2, wherein when the comparing step determines that the running average is lower than the time interval of the current control packet, the adjusting step decreases the clock frequency.

5. The method according to claim 2, wherein when the comparing step determines that the running average exceeds the time interval of the current control packet, the adjusting step increases a size of an incoming buffer in response to the comparison.

6. The method according to claim 2, wherein when the comparing step determines that the running average is lower than the time interval of the current control packet, the adjusting step decreases a size of an incoming buffer in response to the comparison.

7. The method according to claim 2, wherein the adjusting step adjusts a horizontal line time as a function of the comparing step.

8. The method according to claim 2, wherein the adjusting step adjusts a vertical line time as a function of the comparing step.

9. The method according to claim 1, wherein the control packet specifies a quantity of pixels in a horizontal line and includes a decrementing line count and a channel address.

10. The method according to claim 1, wherein the determining step utilizes a local clock to determine the time intervals.

11. An apparatus comprising at least one processor executing in response to stored instruction providing means for synchronizing video data streams, comprising:
  means for accessing a plurality of sequential control packets specifying a quantity of pixels conveyed in an associated plurality of sequential data packets, an individual control packet being associated with a corresponding sequential single data packet and individual control packets having intervening data packets, said control packets and data packets comprising a received video data stream;
  means for accessing a data packet containing a quantity of pixels specified in an associated control packet of the received video data stream;
  means for determining for a plurality of sequential control packets, a reception time interval between an accessed control packet and a subsequent control packet following a data packet associated with the accessed control packet, of the received video data stream;
  means for calculating a running average of the determined reception time intervals, of the received video data stream;
  means for determining a current reception time interval between a current control packet and a previous sequential control packet, of the received video data stream;
  means for comparing the running average with the current reception time interval of the current control packet; and
  means for adjusting a clock frequency of the received video data stream exclusively as a function of the reception interval comparison.

12. The apparatus according to claim 11, wherein the means for comparing determines a difference between the running average and the time interval of the current control packet and the means for adjusting,
  adjusts a horizontal line time of the received video data stream in response to the comparison.

13. The apparatus according to claim 12, wherein when the means for comparing determines that the running average exceeds the time interval of the current control packet, the means for adjusting increases the clock frequency in response to the comparison.

14. The apparatus according to claim 12, wherein when the means for comparing determines that the running average is lower than the time interval of the current control packet, the means for adjusting decreases the clock frequency in response to the comparison.

15. The apparatus according to claim 12, wherein when the means for comparing determines that the running average exceeds the time interval of the current control packet, the means for adjusting increases a size of an incoming buffer in response to the comparison.

16. The apparatus according to claim 12, wherein when the means for comparing determines that the running average is lower than the time interval of the current control packet, the means for adjusting decreases a size of an incoming buffer in response to the comparison.

17. The apparatus according to claim 12, wherein the means for adjusting adjusts a horizontal line time in response to the comparison.

18. The apparatus according to claim 12, wherein the means for adjusting adjusts a vertical line time.

19. The apparatus according to claim 11, wherein the control packet specifies a quantity of pixels in a horizontal line and includes a decrementing line count and a channel address.

20. The apparatus according to claim 11, wherein the means for determining utilizes a local clock to determine the time intervals.

21. An apparatus for synchronizing video data streams comprising:
  one or more memory units; and
  one or more processor modules, coupled to the one or more memory units, the one or more processor modules adapted to execute program code to:
  access a plurality of sequential control packets specifying a quantity of pixels conveyed in an associated plurality of sequential data packets, an individual control packet being associated with a corresponding sequential single data packet and individual control packets having intervening data packets, said control packets and data packets comprising a received video data stream;
  access a data packet containing a quantity of pixels specified in an associated control packet of the received video data stream;
  determine for a plurality of sequential control packets, a reception time interval between an accessed control packet and a subsequent control packet following a data packet associated with the accessed control packet, of the received video data stream;
  calculate a running average of the determined reception time intervals, of the received video data stream;
  determine a current reception time interval between a current control packet and a previous sequential control packet, of the received video data stream;
  compare the running average with the current reception time interval of the current control packet; and
  adjust a clock frequency of the received video data stream exclusively as a function of the reception interval comparison.

22. The apparatus according to claim 21, further comprising program code to determine a difference between the running average and the time interval of the current control packet and a processor module,
  adjusts a horizontal line time of the received vide data stream in response to the comparison.

23. The apparatus according to claim 22, further comprising program code to increase the clock frequency when the running average exceeds the time interval of the current control packet in response to the comparison.

24. The apparatus according to claim 22, further comprising program code to decrease the clock frequency when the running average is lower than the time interval of the current control packet in response to the comparison.

25. The apparatus according to claim 22, further comprising program code to increase the size of an incoming buffer when the running average exceeds the time interval of the current control packet in response to the comparison.

26. The apparatus according to claim 22, further comprising program code to decrease the size of an incoming buffer when the running average is lower than the time interval of the current control packet in response to the comparison.

27. The apparatus according to claim 22, further comprising program to adjust a horizontal line time.

28. The apparatus according to claim 22, further comprising program code to adjust a vertical line time.

29. The apparatus according to claim 21, further comprising program code to utilize a local clock to determine the time intervals.

* * * * *